United States Patent
Hashimoto

(10) Patent No.: US 6,963,367 B1
(45) Date of Patent: Nov. 8, 2005

(54) IMAGE PICKUP APPARATUS

(75) Inventor: Seiji Hashimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 646 days.

(21) Appl. No.: 09/611,269

(22) Filed: Jul. 6, 2000

(30) Foreign Application Priority Data

Jul. 8, 1999 (JP) ................................ 11-194283

(51) Int. Cl.$^7$ ........................ H04N 5/217; H04N 5/228; H04N 1/40; H01L 27/00
(52) U.S. Cl. ................... 348/241; 348/222.1; 358/443; 250/208.1
(58) Field of Search ............................... 348/241, 243, 348/248, 249, 222.1; 250/208.1; 358/443, 358/448, 463

(56) References Cited

U.S. PATENT DOCUMENTS

| | | | | |
|---|---|---|---|---|
| 4,167,755 A | * | 9/1979 | Nagumo ..................... 348/243 |
| 4,644,287 A | * | 2/1987 | Levine ........................ 348/241 |
| 4,768,085 A | | 8/1988 | Hashimoto ................... 358/48 |
| 4,876,601 A | | 10/1989 | Hashimoto et al. .... 358/213.26 |
| 4,910,597 A | | 3/1990 | Harada et al. ......... 358/213.15 |
| 4,910,599 A | | 3/1990 | Hashimoto ............. 358/213.26 |
| 4,914,519 A | | 4/1990 | Hashimoto et al. .... 358/213.18 |
| 4,967,067 A | | 10/1990 | Hashimoto et al. ...... 250/208.1 |
| 4,985,758 A | | 1/1991 | Hashimoto ..................... 358/44 |
| 5,086,344 A | * | 2/1992 | D'Luna et al. ............. 348/250 |
| 5,162,912 A | | 11/1992 | Ueno et al. ........... 358/213.16 |
| 5,262,850 A | | 11/1993 | Hashimoto ................... 358/500 |
| 5,288,988 A | | 2/1994 | Hashimoto et al. ...... 250/208.1 |
| 5,315,412 A | | 5/1994 | Mihara et al. ............... 358/512 |
| 5,424,529 A | | 6/1995 | Hashimoto et al. ...... 250/208.1 |
| 5,471,515 A | * | 11/1995 | Fossum et al. ................ 377/60 |
| 5,477,047 A | | 12/1995 | Nakagawa et al. ...... 250/208.1 |
| 5,556,809 A | | 9/1996 | Nakagawa et al. ......... 437/209 |
| 5,587,814 A | | 12/1996 | Mihara et al. ............... 358/512 |
| 5,781,312 A | * | 7/1998 | Noda ......................... 358/482 |
| 6,166,769 A | * | 12/2000 | Yonemoto et al. .......... 348/241 |
| 6,538,693 B1 | * | 3/2003 | Kozuka ................... 348/24 T |

FOREIGN PATENT DOCUMENTS

| | | | | |
|---|---|---|---|---|
| GB | 2329959 | * | 7/1999 | ............ H04N 3/15 |
| JP | 59-275 | | 1/1984 | |
| JP | 59-62272 | | 4/1984 | |
| JP | 61-128681 | * | 6/1986 | .......... H04N 5/335 |
| JP | 3-227184 | | 10/1991 | |
| JP | 4-330876 | | 11/1992 | |
| JP | 4-330877 | | 11/1992 | |
| JP | 06-141129 | | 5/1994 | |
| JP | 9-149323 | | 6/1997 | |

* cited by examiner

*Primary Examiner*—David L. Ometz
*Assistant Examiner*—Nhan Tran
(74) *Attorney, Agent, or Firm*—Fitzpatrick, Cella, Harper & Scinto

(57) ABSTRACT

To obtain a high-quality image, there is provided an image pickup apparatus having a plurality of pixels including a photoelectric conversion unit for converting an optical signal from an object into an electrical signal and a read unit for reading out the signal from the photoelectric conversion unit, a difference circuit for performing difference processing on a noise component contained in the signal read by the read unit, a detection circuit for detecting image pickup conditions, and a correction circuit for performing correction of execution of difference processing in accordance with an output from the detection circuit.

1 Claim, 12 Drawing Sheets

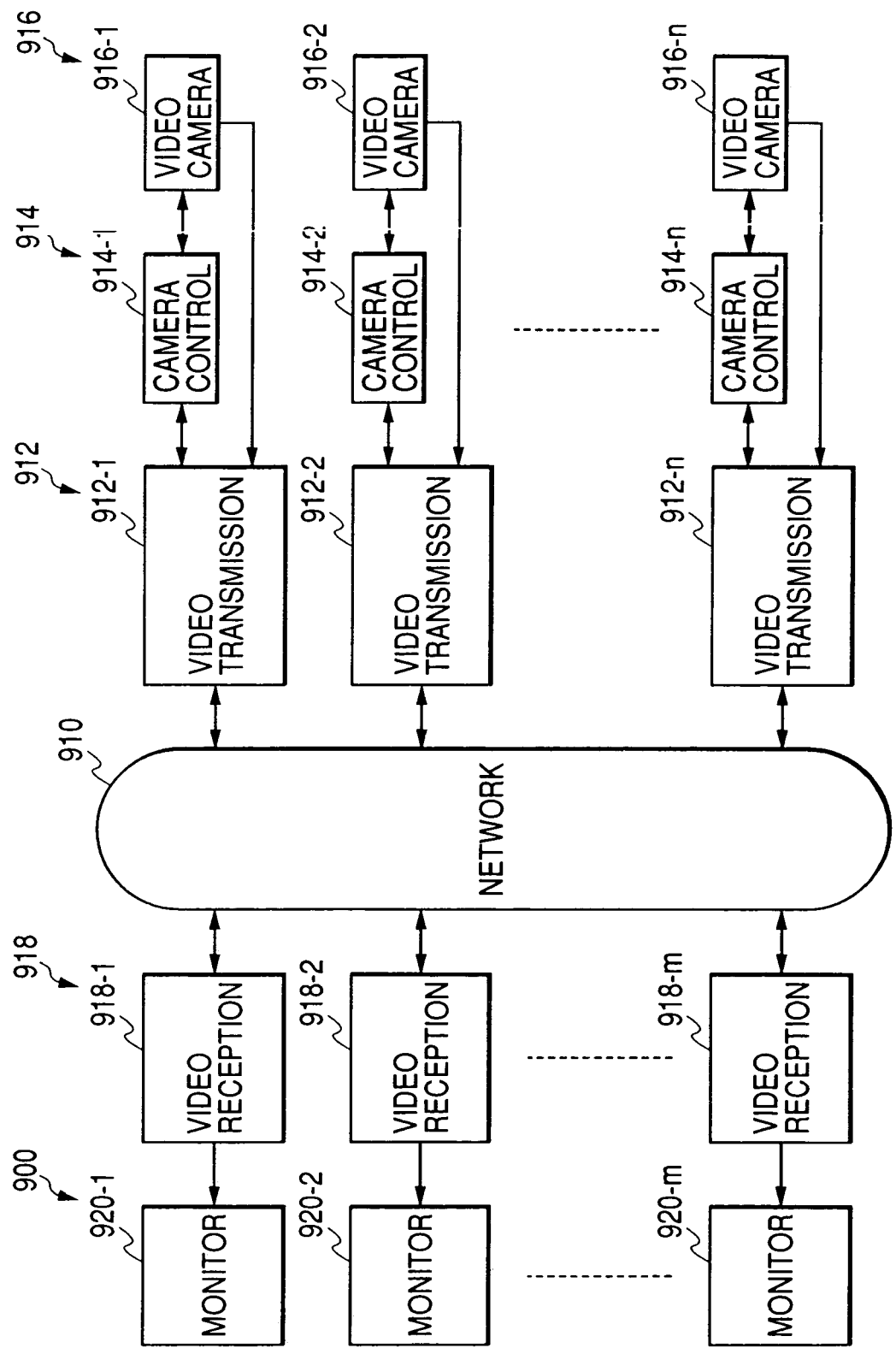

IMAGE PICKUP APPARATUS

BACKGROUND OF THE INVENTION

1. Field of the Invention

The present invention relates to a solid-state image pickup apparatus with an array of a plurality of pixels each having a photoelectric conversion function, and an image pickup system using the solid-state image pickup apparatus.

2. Related Background Art

Solid-state image pickup elements are roughly classified into charge transfer type elements such as a CCD, and XY address type elements such as a MOS image pickup device.

Using this solid-state image pickup element as a sensor provides not only many merits but also demerits. One of the demerits is image deterioration called as "smear" generated when a bright object image is picked up.

In the CCD, part of object light leaks as photo-leak to a vertical transfer register adjacent to a photodiode, and is observed as a white noise band on the image in the vertical direction of the bright object image. This phenomenon occurs with a light quantity corresponding to about 60 dB to about 100 dB of light amount with which the photodiode saturates.

In the MOS image pickup device, as shown in FIG. 1, the pixel is generally made up of a photodiode 1, an amplification MOS transistor 2 for amplifying and outputting a signal from the photodiode, a transfer MOS transistor 3 for transferring the signal from the photodiode 1 to the amplification MOS transistor 2, a reset MOS transistor for supplying a reset potential to the gate region of the amplification MOS transistor, and a selection MOS transistor 5 for selectively outputting a signal from the amplification MOS transistor 2. It has been understood that the smear can be avoided substantially when the gate electrode region of the amplification MOS transistor is reset before the signal from the photodiode 1 is transferred to the amplification MOS transistor 2. For example, the transfer time from the photodiode to the amplification MOS transistor is several $\mu s$, while an exposure time is 16 or 17 ms for a movie camera such as a video camera. The light quantity difference is about 100 dB, and the gate electrode region of the amplification MOS transistor is shielded from light. In this situation, it has been understood that smear is considered not to occur.

However, the present inventors have conducted image pickup experiments to find the following problems.

There is a conventional solid-state image pickup apparatus having a difference means for subtracting a noise component in order to remove a noise component contained in a signal photoelectrically converted and output by a photoelectric conversion means such as a photodiode.

An example of the solid-state image pickup apparatus having the difference means is shown in FIG. 2. FIG. 3 is a timing chart showing the operation timing of the solid-state image pickup apparatus in FIG. 2.

A pixel 6 has the same structure as that of the pixel shown in FIG. 1. A reset signal vn obtained when the input of an amplification MOS transistor is reset, is stored in a memory CN7 during a period t1, and a signal vs generated by photoelectric conversion by a photoelectric conversion means is transferred to the input of the amplification MOS transistor during a period t2. At the same time, a signal VS output from the amplification MOS transistor is stored in a memory CS 8. The signal VS stored in the memory CS 8 contains the signal (vs) generated by photoelectric conversion and the reset signal (vn).

The reset signal vn stored in the memory CN 7 and the signal VS (=vs+vn) stored in the memory CS 8 are read out to a differential amplifier 9. The differential amplifier calculates difference VS−vn, and outputs a signal vs free from any noise component, from which signal vs the reset signal as a noise component is removed.

The input of the amplification MOS transistor should be reset during the period t1, but a photo-leak noise signal v1 is added to the reset signal which is a noise component, owing to photo-leak of very strong light (VN=vn+v1). Hence, an output signal from the differential amplifier is VS−VN=vs−v1. If v1 saturates, the output signal vs−v1 becomes 0, and the image becomes darkened regardless of a bright object.

FIG. 4 is a conceptual view showing this phenomenon. The abscissa represents the incident light quantity on the photoelectric conversion means, and the ordinate represents the level of a signal generated in the photoelectric conversion means.

When, for example, a bright object (the sun, a light source, or the like) exists in an object to be picked up, the corresponding portion becomes a darkened image depending on image pickup conditions, resulting in low image quality.

SUMMARY OF THE INVENTION

It is an object of the present invention to provide an image pickup apparatus capable of obtaining high image quality regardless of image pickup conditions.

To achieve the above object, according to aspect of the present invention, there is provided an image pickup apparatus comprising a plurality of pixels including photoelectric conversion means for converting an optical signal from an object into an electrical signal and read means for reading out the signal from the photoelectric conversion means, difference means for performing difference processing on a noise component contained in the signal read by the read means, detection means for detecting an image pickup condition, and correction means for performing correction of execution of difference processing in accordance with an output from the detection means.

According to another aspect of the present invention, there is provided an image pickup apparatus comprising a plurality of pixels including photoelectric conversion means for converting an optical signal from an object into an electrical signal and read means for reading out the signal from the photoelectric conversion means, difference means for performing difference processing on a noise component contained in the signal read by the read means, detection means for detecting an image pickup condition, and correction means for controlling the difference means in accordance with an output from the detection means.

In addition, according to still another aspect of the present invention, is provided an image pickup apparatus comprising a pixel including photoelectric conversion means for converting an optical signal from an object into an electrical signal and read means for reading out the signal from the photoelectric conversion means, difference means for performing difference operation on a noise component contained in the signal read by the read means, detection means for detecting a signal level of noise generated in the pixel, and correction means for correcting the signal read by the read means in accordance with the detection means.

Other objects and features of the present invention will be apparent from the following description in conjunction with an output of the accompanying drawings.

BRIEF DESCRIPTION OF THE DRAWINGS

FIG. 15 is a block diagram showing an image pickup system according to the seventh embodiment.

DESCRIPTION OF THE PREFERRED EMBODIMENTS

Figure 5:
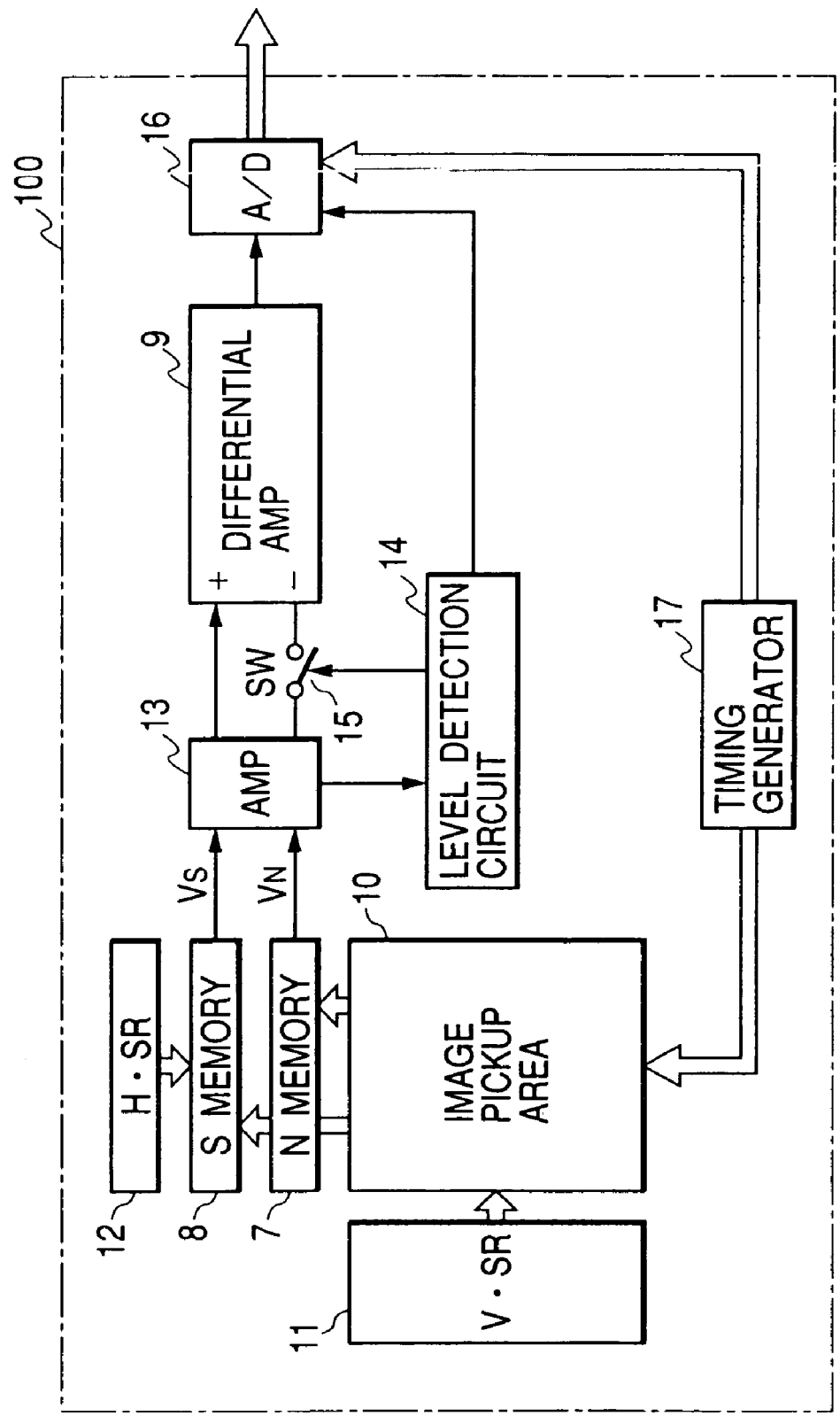
FIG. 5 is a block diagram showing a solid-state image pickup apparatus according to the first embodiment.

The first embodiment of the present invention will be described. FIG. 5 shows a solid-state image pickup apparatus 100 according to the first embodiment.

Figure 1:
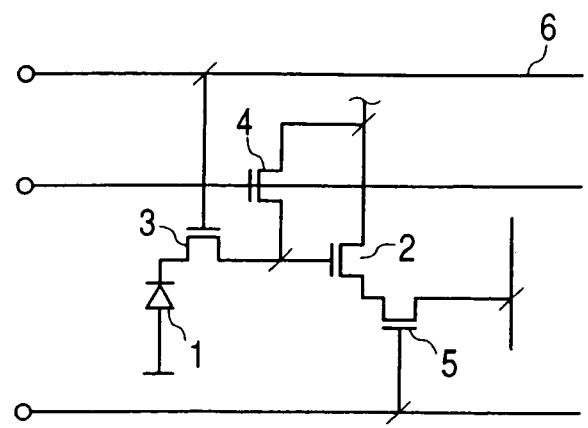
FIG. 1 is a circuit diagram showing the equivalent circuit of a pixel.
Figure 2:
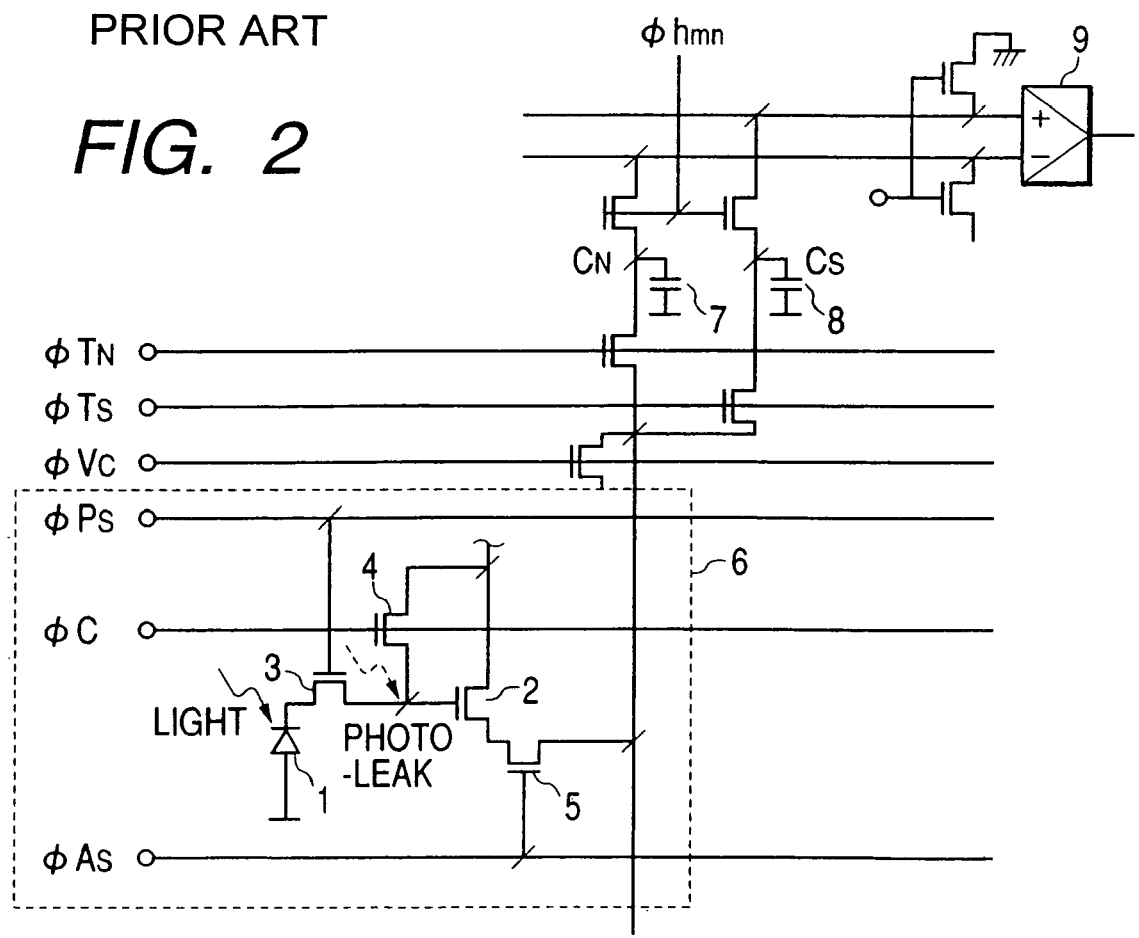
FIG. 2 is a circuit diagram showing a conventional solid-state image pickup apparatus.
Figure 3:
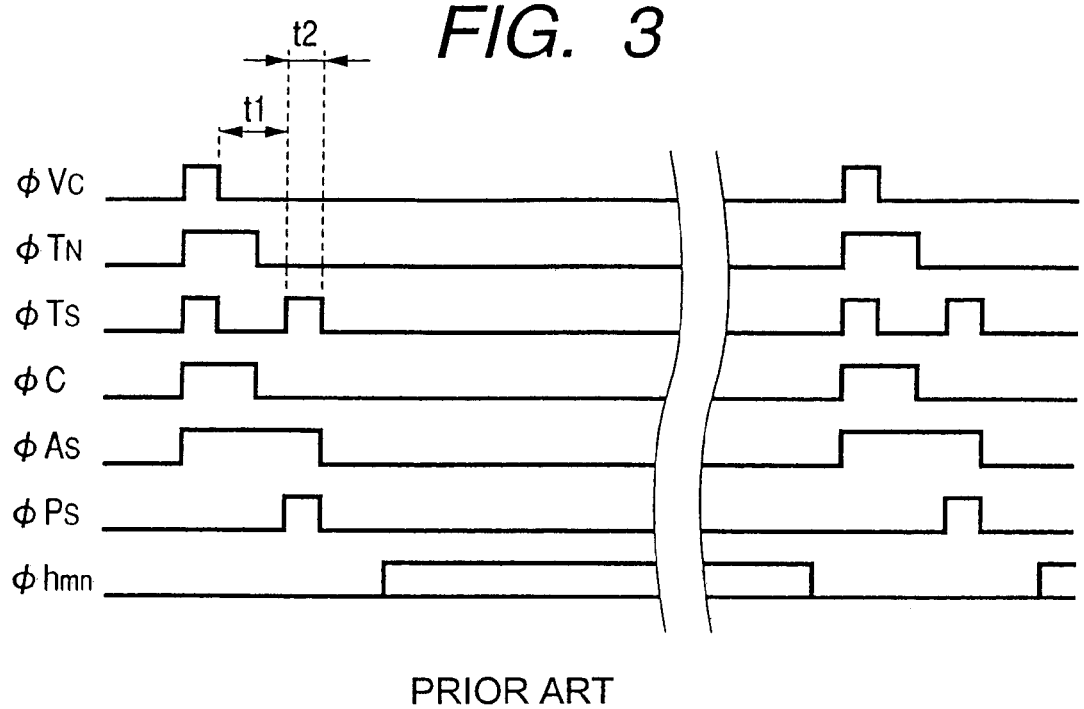
FIG. 3 is a timing chart of the solid-state image pickup apparatus in FIG. 2.
Figure 4:
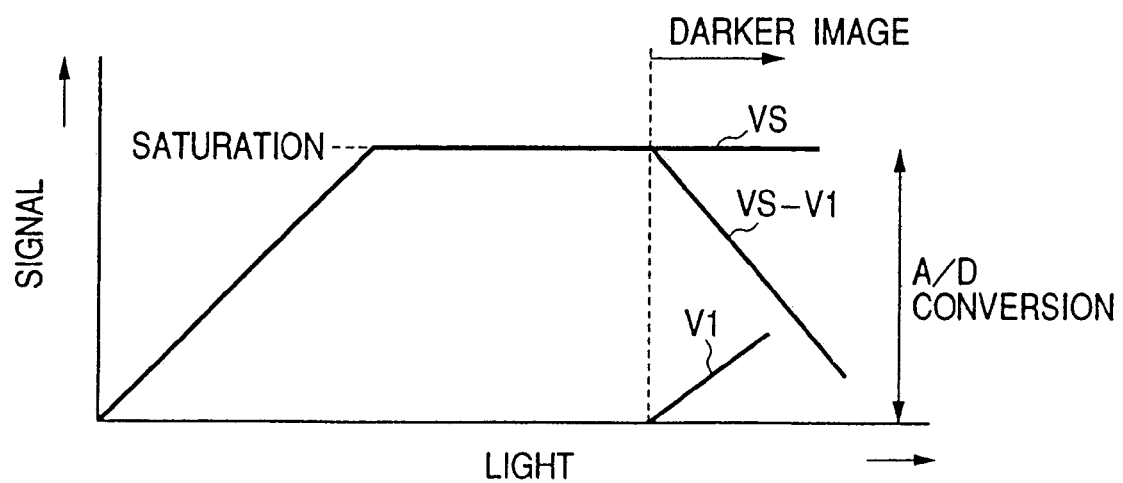
FIG. 4 is a graph for explaining the prior art.

In FIG. 5, a plurality of pixels 6 shown in FIG. 1 are arranged horizontally and vertically in an image pickup area 10. As shown in FIG. 1, each pixel is made up of a photodiode 1 serving as a photoelectric conversion means, an amplification MOS transistor 2 serving as a read means for amplifying and outputting a signal from the photodiode, a transfer MOS transistor 3 serving as a transfer means for transferring the signal from the photodiode 1 to the amplification MOS transistor 2, a reset MOS transistor serving as a reset means for supplying a reset potential to the input of the amplification MOS transistor, and a selection MOS transistor 5 serving as a selection means for selectively outputting a signal from the amplification MOS transistor 2. A vertical shift register 11 sequentially outputs signals from pixels on horizontal lines in units of lines. An S memory 8 accumulates a signal VS as a sum of a photoelectrically conversion signal generated in the photodiode 1 and output from the amplification MOS transistor 2 in the pixel and a reset signal vn which is a noise component. An N memory 7 accumulates a signal VN as a sum of the reset signal vn which is a noise signal, and a photo-leak noise signal v1. A horizontal shift register 12 outputs signals accumulated in the S memory 8 and N memory 7 in units of lines. An amplifier 13 amplifies the signals VS and VN respectively output from the S memory 8 and N memory 7. A differential amplifier 9 serves as a difference means for performing difference operation on the signals VS and VN in order to subtract the noise component from the signal VS output from the amplifier 13. A level detection circuit 14 serves as a detection means for detecting image pickup conditions including the object conditions of an object to be picked up. A switch 15 serves as a correction means for performing correction of (selectively switching between execution/non-execution of difference operation) execution of difference processing in accordance with an output from the level detection circuit 14. When the switch 15 is opened in accordance with an output from the level detection circuit, the differential amplifier does not receive any signal VN, and receives the signal VS not subjected to difference processing. An A/D conversion circuit 16 converts an analog signal output from the differential amplifier into a digital signal. A timing generator 17 controls the timings of the image pickup area 10 and A/D conversion circuit 16.

The operations of the level detection circuit 14 and switch 15 will be described in detail.

Figure 6:
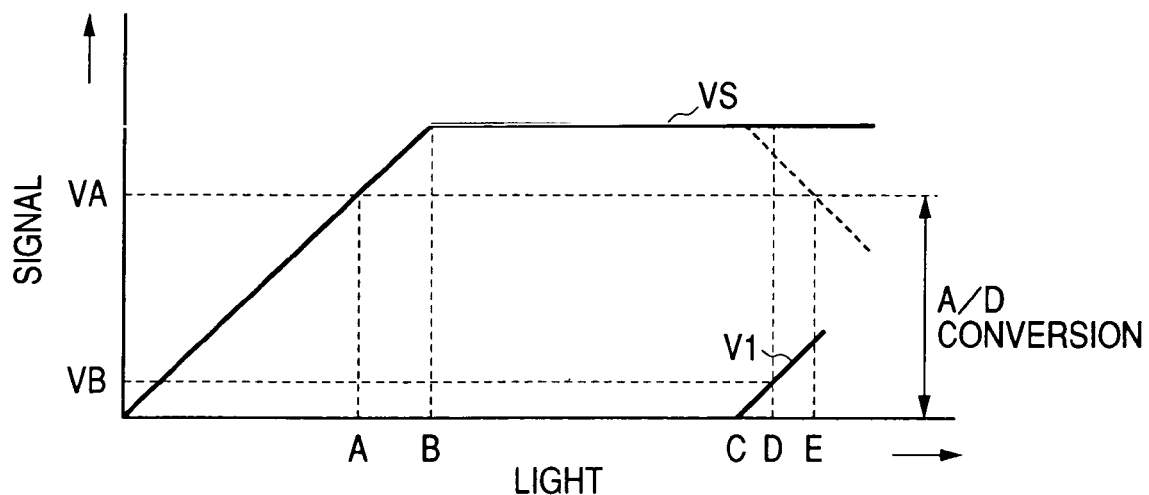
FIG. 6 is a graph for explaining the first or second embodiment.

FIG. 6 is a graph in which the abscissa represents the incident light quantity on the photodiode 1, and the ordinate represents the level of a signal generated in the photodiode. The signal vs generated in the photodiode saturates at a light quantity B, and the photo-leak noise v1 gradually reaches a high signal level around a light quantity C. When difference processing is done at the light quantity C or more, the image becomes dark.

To prevent this phenomenon, the level detection circuit 14 detects at least whether the signal vs generated in the photodiode saturates or the photo-leak noise signal v1 reaches a predetermined level or more, and when the circuit 14 detects this, the switch 15 is opened to stop difference processing. A signal not subjected to difference processing contains a noise component, and is processed as a saturation signal (compressed by Knee processing).

The signal detected as a saturation signal is set to be a signal at given level VA or more which is slightly smaller than a signal level at which the signal completely saturates.

In the first embodiment, the level detection circuit detects whether the signal VS output from the S memory 8 is at signal level VA or more, thereby detecting saturation of the photodiode, or detects whether the signal VN output from the N memory 7 is at signal level VB or more, thereby detecting that the photo-leak noise signal v1 is a predetermined level or more.

When the level detection circuit 14 detects that the signal VS is at signal level VA or more, or the signal VN is at signal level VB or more, difference processing is not executed, thereby obtaining an image free from being darkened.

The first embodiment has exemplified the level detection circuit 14 as a detection means. However, the detection means suffices to detect image pickup conditions, and may be located not at the output stage of the amplifier 13 but, e.g., within the pixel.

The first embodiment has exemplified the switch 15 for stopping difference processing as a correction means. However, the correction means suffices to perform correction of execution of difference processing in accordance with an output from the detection means, and may be located in, e.g., the image pickup area 10. The correction means may stop transfer of an input or output to or from the N memory 7, or stop transfer of a noise signal from the pixel 6.

All the building elements of the solid-state image pickup apparatus 100 may be formed on a single semiconductor substrate by the CMOS process or the like. Alternatively, e.g., the A/D conversion circuit 16 and timing generator may be formed on different semiconductor substrates.

The pixels of the solid-state image pickup apparatus in the first embodiment may be area sensors arranged two-dimensionally, or line sensors arranged one-dimensionally.

Figure 7:
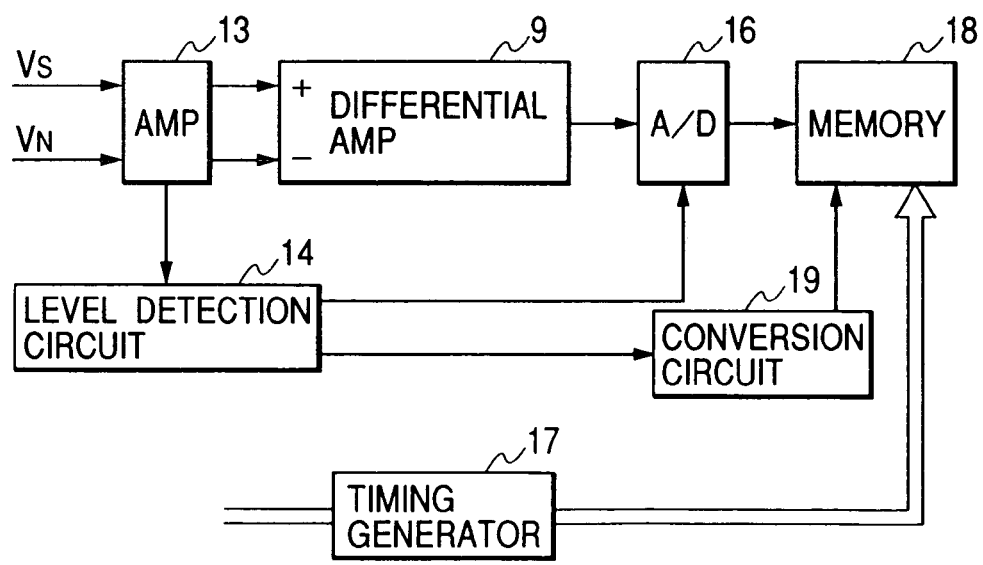
FIG. 7 is a block diagram showing a solid-state image pickup apparatus according to the second embodiment.

The second embodiment of the present invention will be described. FIG. 7 is a block diagram showing part of a solid-state image pickup apparatus 100 according to the second embodiment. The input stage of an amplifier 13, which is not illustrated in FIG. 7, is the same as that described in the first embodiment.

A memory 18 accumulates a signal from an A/D conversion circuit 16. A conversion circuit 19 serving as a correction means performs correction of execution of difference processing (converts a signal having undergone difference processing into a signal of a predetermined signal level) in accordance with an output of a level detection circuit 14 serving as a detection means. The level detection circuit serving as a detection means detects image pickup conditions including the object conditions of an object to be picked up by the same method as in the first embodiment.

In the second embodiment, unlike the first embodiment, a differential amplifier 9 serving as a difference means executes difference processing (VS−VN) even when a signal VS is detected by the level detection circuit to be at signal level VA or more or even when a signal VN is detected to be at signal level VB or more. Further, the processed signal is converted into a digital signal by the A/D conversion circuit 16, and stored in the memory 18. In reading out a signal from the memory 18, when the signal VS is detected by the level detection circuit to be at signal level VA or more or when the signal VN is detected to be at signal level VB or more, the conversion circuit 19 converts the signal into a signal of a predetermined level (e.g., signal level VA). Alternatively, a digital signal from the A/D conversion circuit 16 may be converted into saturation data upon reception of a saturation detection signal from the level detection circuit 14.

In other words, when the level detection circuit 14 detects that the signal VS is at signal level VA or more, or the signal VN is at signal level VB or more, the conversion circuit 19 is operated to obtain an image free from being dardened.

The second embodiment has exemplified the level detection circuit 14 as a detection means. However, the detection means suffices to detect image pickup conditions, and may be located not at the output stage of the amplifier 13 but, e.g., within the pixel.

The second embodiment has exemplified as a correction means an arrangement of converting a signal read out from the memory into a signal of a predetermined level. However, the correction means suffices to perform correction of execution of difference processing in accordance with an output of the detection means, and may be located in, e.g., the image pickup area 10.

All the building elements of the solid-state image pickup apparatus 100 may be formed on a single semiconductor substrate by the CMOS process or the like. Alternatively, e.g., the A/D conversion circuit 16 and timing generator may be formed on different semiconductor substrates.

The pixels of the solid-state image pickup apparatus in the second embodiment may be area sensors arranged two-dimensionally, or line sensors arranged one-dimensionally.

Figure 8:
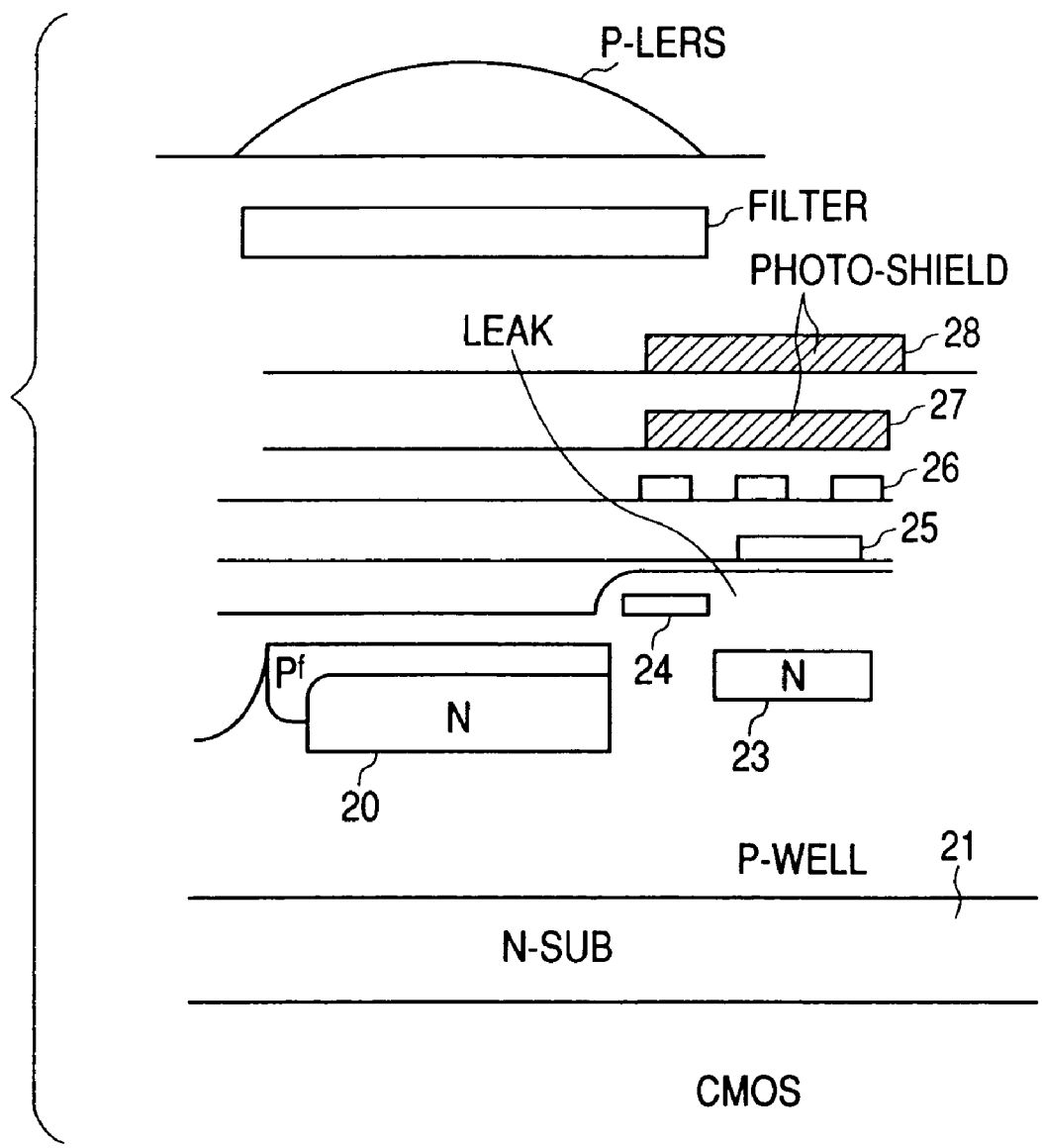
FIG. 8 is a view showing the structure of a pixel.

FIG. 8 is a view showing the section of the pixel. The pixel is completely shielded from light in order to prevent any photo-leak.

In FIG. 8, a photodiode (corresponding to FIG. 1) is constituted by a region 20 serving as an n-type semiconductor region, and a region 21 serving as a p-type semiconductor region. A region 23 serving as an n-type semiconductor region corresponds to the input of the amplification MOS transistor. A gate electrode 24 transfers signals from the regions 20 and 21 constituting the photodiode to the region 23. Photo-shield films 25, 26, and 27 are made of aluminum, and a black member 28 prevents any photo-leak together with the photo-shield films 25, 26, and 27.

However, in the solid-state image pickup apparatus according to the first and second embodiment, the pixel can be shielded from light by a simple process. That is, the black member 28 is unnecessary, and the photo-shield film 27 can also be eliminated by efficiently using the photo-shield film 26. By eliminating the black member and photo-shield film 27, the distance between the photodiode and the microlens can be shortened to increase the focusing efficiency by the microlens.

The third embodiment of the present invention will be described.

Figure 9:
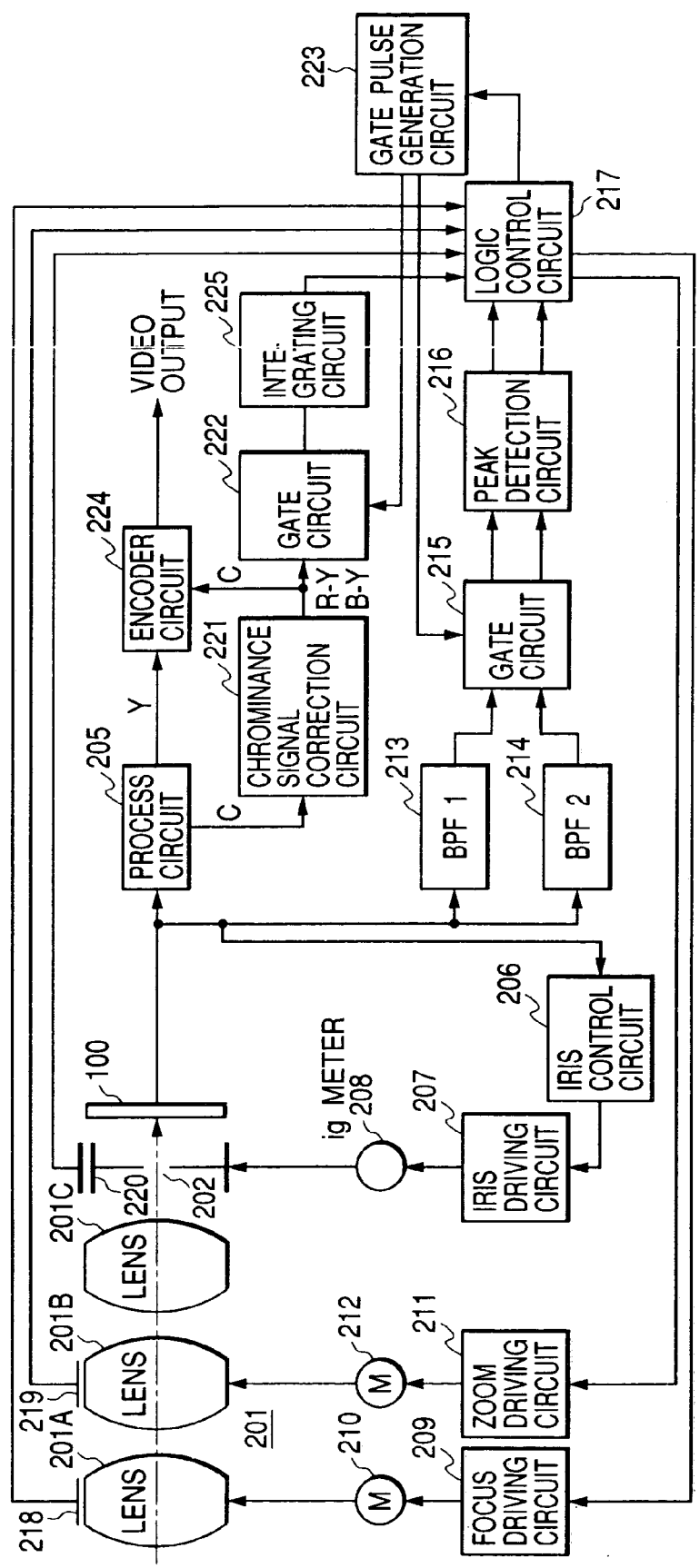
FIG. 9 is a block diagram showing an image pickup system according to the third embodiment.

FIG. 9 is a block diagram showing an application of the solid-state image pickup apparatus in the first or second embodiment to a video camera serving as an image pickup system.

A photographing lens 201 comprises a focus lens 201A for adjusting the focus, a zoom lens 201B for performing zoom operation, and an imaging lens 201C.

An iris 202 is arranged after the photographing lens 201. A solid-state image pickup apparatus 100 described in the first or second embodiment photoelectrically converts an object image formed on the image pickup plane into an electrical image pickup signal. A process circuit 205 performs predetermined processing such as gamma correction, color separation, or blanking processing on a video signal output from the image pickup apparatus 100, and outputs a luminance signal Y and chrominance signals C. The chrominance signals C output from the process circuit 205 are subjected to white balance correction and color balance correction by a chrominance signal correction circuit 221, and output as color difference signals R-Y and B-Y. The luminance signal Y output from the process circuit 205, and the color difference signals R-Y and B-Y output from the chrominance signal correction circuit 221 are modulated by an encoder circuit (ENC circuit) 224, and output as a standard television signal. The standard television signal is supplied to a video recorder or a monitor EVF such as an electronic view finder (neither is shown).

An iris control circuit 206 controls an iris driving circuit 207 based on a video signal supplied from a the solid-state image pickup apparatus 100 and automatically controls an ig meter 208 in order to control the aperture value of the iris 202 so as to keep the level of the video signal at a predetermined level.

Bandpass filters (BPFs) 213 and 214 have different band limitations for extracting high-frequency components necessary for focus detection from the video signal output from the solid-state image pickup apparatus 100. Signals output from the first bandpass filter (BPF1) 213 and second bandpass filter (BPF2) 214 are gated by a gate circuit 215 and a focus gate frame signal. The peak values of these signals are detected by a peak detection circuit 216, and then the signals are held and input to a logic control circuit 217. These signals are called a focus voltage, and the focus is adjusted based on the focus voltage. A focus encoder 218 detects the moving position of the focus lens 201A, a zoom encoder 219 detects the focal length of the zoom lens 201B, and an iris encoder 220 detects the aperture value of the iris 202. The detection values of the encoders are supplied to the logic control circuit 217 for controlling the system.

The logic control circuit 217 detects the focus with respect to an object to be picked up, and adjusts the focus on the basis of a video signal corresponding to a set focus detection area. That is, the logic control circuit 217 receives peak value information of high-frequency components supplied from the bandpass filters 213 and 214. To drive the focus lens 201A to a position at which the peak values of the high-frequency components maximize, the logic control circuit 217 supplies to the focus driving circuit 209 a control signal for the rotational direction, rotational speed, and rotation/stop of a focus motor 210, thereby controlling the focus motor 210.

In the third embodiment, the solid-state image pickup apparatus 100 and the remaining building elements such as the process circuit 205 and logic control circuit may be formed on different semiconductor substrates, or may be formed on a single semiconductor substrate by the CMOS process or the like.

The fourth embodiment of the present invention will be described.

Figure 10:
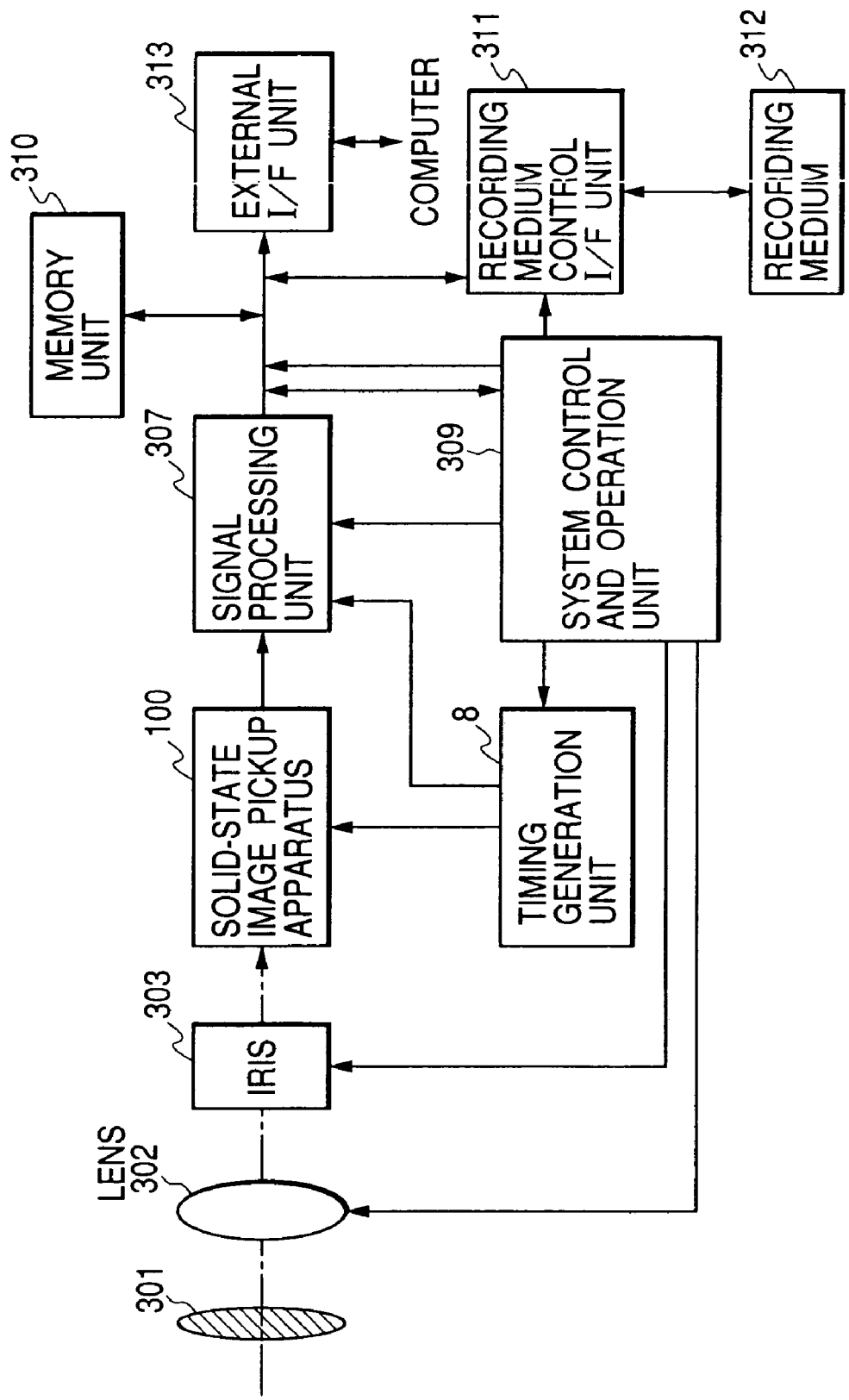
FIG. 10 is a block diagram showing an image pickup system according to the fourth embodiment.

FIG. 10 is a block diagram showing an application of the solid-state image pickup apparatus in the first or second embodiment to a still camera serving as an image pickup system.

In FIG. 10, a barrier 301 serves as both a lens protector and main switch. A lens 302 forms an optical image of an object on a solid-state image pickup apparatus 100. An iris 303 changes the quantity of light having passed through the lens 302. The solid-state image pickup apparatus 100 described in the first or second embodiment receives the object image formed by the lens 302 as an image signal. A signal processing unit 307 performs various correction processes on image data output from the solid-state image pickup apparatus 100, and compresses data. A timing generation unit 308 outputs various timing signals to the solid-state image pickup apparatus 100 and signal processing unit 307. A system control and operation unit 309 performs various operations, and controls the whole video camera. A memory unit 310 temporarily stores image data. An I/F unit 311 records and reads data on and from a recording medium. A removable recording medium 312 such as a semiconductor memory records and reads image data. An I/F unit 313 communicates with an external computer or the like.

The operation of the still video camera having this arrangement in photographing will be explained.

When the barrier 301 is opened, the main power, the power of the control system, and the power of the image pickup system are sequentially turned on.

To control the exposure amount, the system control and operation unit 309 sets the iris 303 to a full-aperture state, and a signal output from the solid-state image pickup apparatus 100 is input to the signal processing unit 307. Operation for exposure is done by the system control and operation unit 309 using the processed data. The system control and operation unit 309 determines the brightness from the results of photometry, and controls the iris in accordance with the result of the determination.

The system control and operation unit 309 extracts an high-frequency component from a signal output from the solid-state image pickup apparatus 100, and calculates the distance to the object. Then, the lens is driven to determine whether the camera is in focus or out of focus, and if the camera is determined to be out of focus, the lens is driven again to measure the distance. After the camera is confirmed to be in focus, actual exposure starts.

Upon completion of exposure, an image signal output from the solid-state image pickup apparatus 100 is written in the memory unit by the system control and operation unit 309 via the signal processing unit 307.

The data accumulated in the memory unit 310 is recorded on the removable recording medium 312 such as a semiconductor memory via the recording medium control I/F unit 311 under the control of the system control and operation unit 309.

Alternatively, the data may be directly input to a computer or the like via the external I/F unit 313 to process the image.

The fifth embodiment of the present invention will be described.

Figure 11:
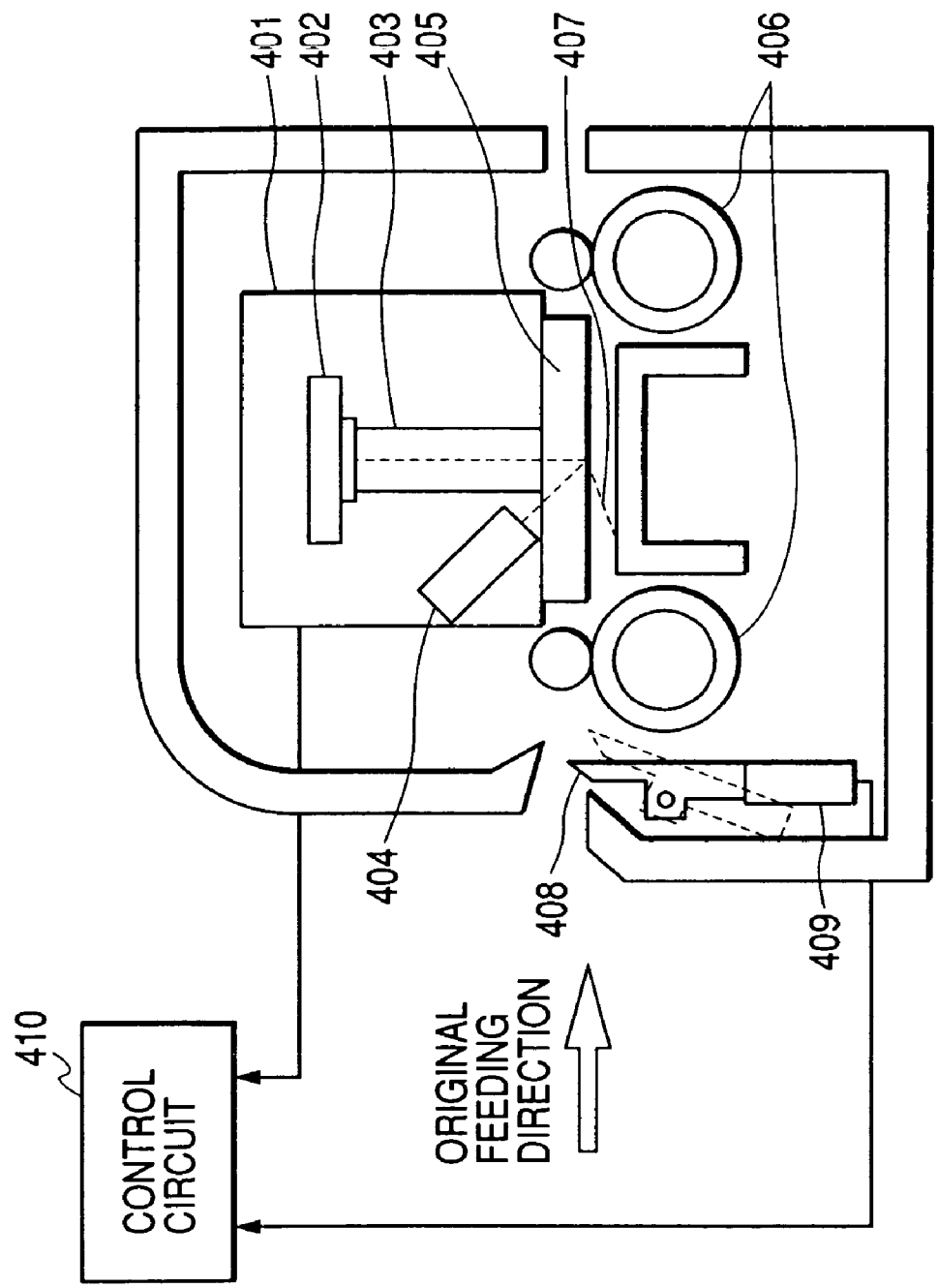
FIG. 11 is a sectional view showing an image pickup system according to the fifth embodiment.
Figure 12:
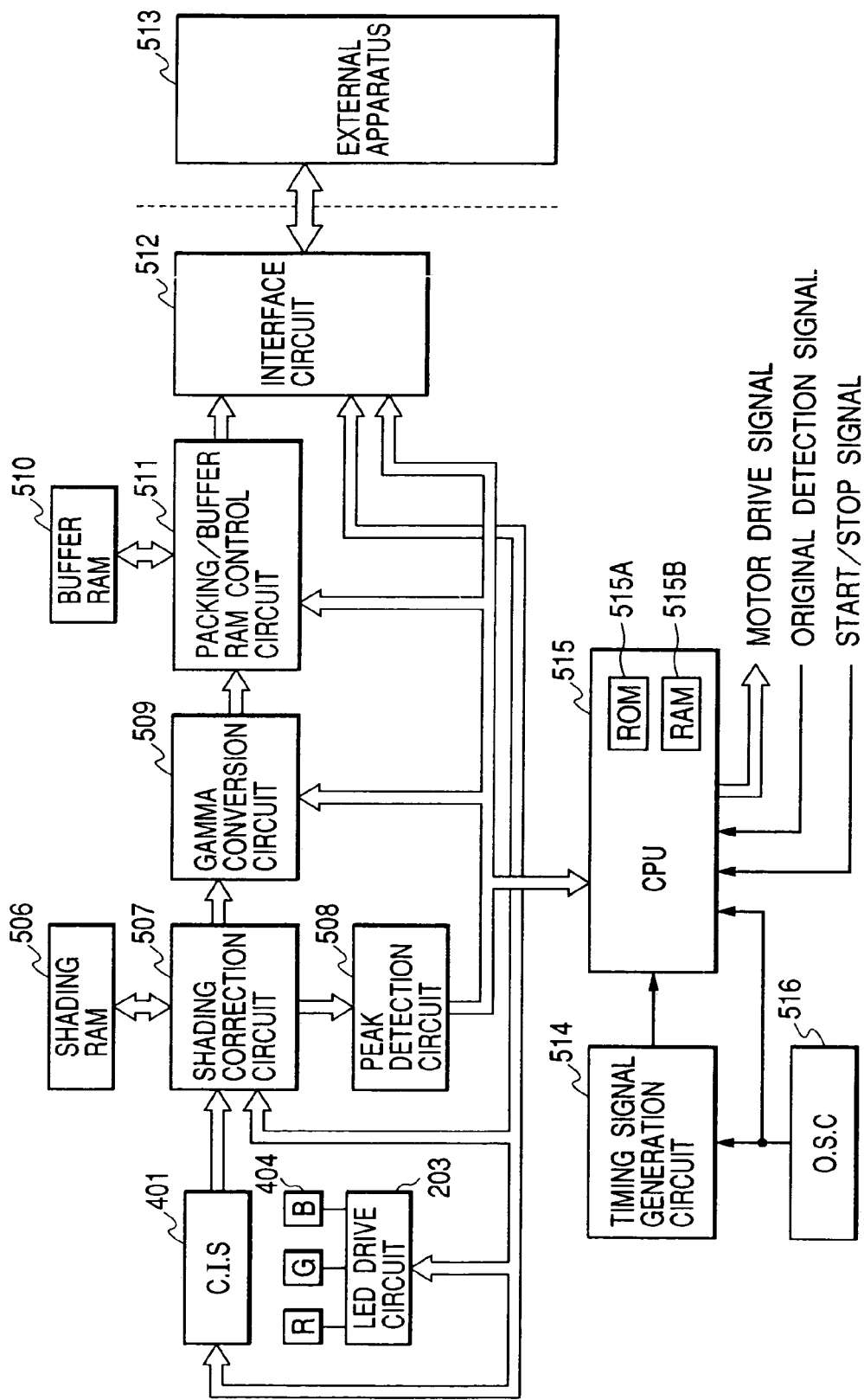
FIG. 12 is a block diagram showing the image pickup system according to the fifth embodiment.

FIGS. 11 and 12 are views showing an application of the solid-state image pickup apparatus in the first or second embodiment to a sheet feed type original image recording apparatus serving as an image pickup system.

FIG. 11 is a schematic view showing an original image read apparatus for reading an original image.

A contact type image sensor (to be referred to as "CIS" hereinafter) 401 is constituted with a solid-state image pickup apparatus 100 described in the first embodiment, SELFOC lens 403, LED array 404, and contact glass 405.

Feeding rollers 406 are arranged before and after the CIS 401, and used to place an original. A contact sheet 407 is used to bring the original into contact with the CIS 401. A control circuit 410 processes a signal from the CIS 401.

An original detection lever 408 detects insertion of an original. When an original is inserted, the original detection lever 408 inclines to change an output of an original sensor 409. This detection state is transferred to a CPU 515 in the control circuit 410, and the CPU 515 determines insertion of the original to drive the driving motor (not shown) of the original feeding rollers 406. Accordingly, the feeding rollers 406 start feeding the original, and the original is read.

FIG. 12 is a block diagram showing an electrical arrangement to explain the control circuit 410 in FIG. 11 in detail. The circuit operation will be explained with reference to FIG. 12.

In FIG. 12, the image sensor 401 (CIS 401 in FIG. 11) is integrally constituted with the LEDs 404 of R, G, and B colors serving as a light source. While an original is fed onto the contact glass 405 of the CIS 401, an LED control (drive) circuit 503 switches between and turns on the LEDs 404 of R, G, and B colors in units of lines to read a color image line-sequentially for the R, G, and B colors.

A shading RAM 506 stores shading correction data by reading a calibration sheet in advance. A shading correction circuit 507 performs shading correction of a read image signal on the basis of the data in the shading RAM 506. A peak detection circuit 508 detects the peak value of read image data for each line, and is used to detect the leading end of an original.

A gamma conversion circuit 509 performs gamma conversion of image data read in accordance with a gamma curve set in advance by the host computer.

A buffer RAM 510 temporarily stores image data in order to match the timings of actual read operation and communication with the host computer. A packing/buffer RAM control circuit 511 performs packing processing corresponding to an image output mode (binary, 4-bit multilevel, 8-bit multilevel, or 24-bit multilevel) set in advance by the host computer, then writes the data in the buffer RAM 510, and reads out image data from the buffer RAM 510 to an interface circuit 512.

The interface circuit 512 receives a control signal from an external apparatus such as a personal computer serving as the host apparatus of the image read apparatus according to the fifth embodiment, and outputs an image signal to the external apparatus.

A CPU 515 is implemented by, e.g., a microcomputer, has a ROM 515A storing processing sequences and a work RAM 515B, and controls the respective units in accordance with a procedure stored in the ROM 515A.

An oscillator 516 is, e.g., a quartz oscillator, and a timing signal generation circuit 514 divides the frequency of an output of the oscillator 516 in accordance with the settings of the CPU 515 to generate various timing signals serving as the reference of the operation. An external apparatus 513 is connected to the control circuit via the interface circuit 512. An example of the external apparatus is a personal computer.

In the fifth embodiment, the solid-state image pickup apparatus 100 and control circuit 410 may be formed on different semiconductor substrates, or may be formed on a single semiconductor substrate by the CMOS process or the like.

The sixth embodiment of the present invention will be described.

Figure 13:
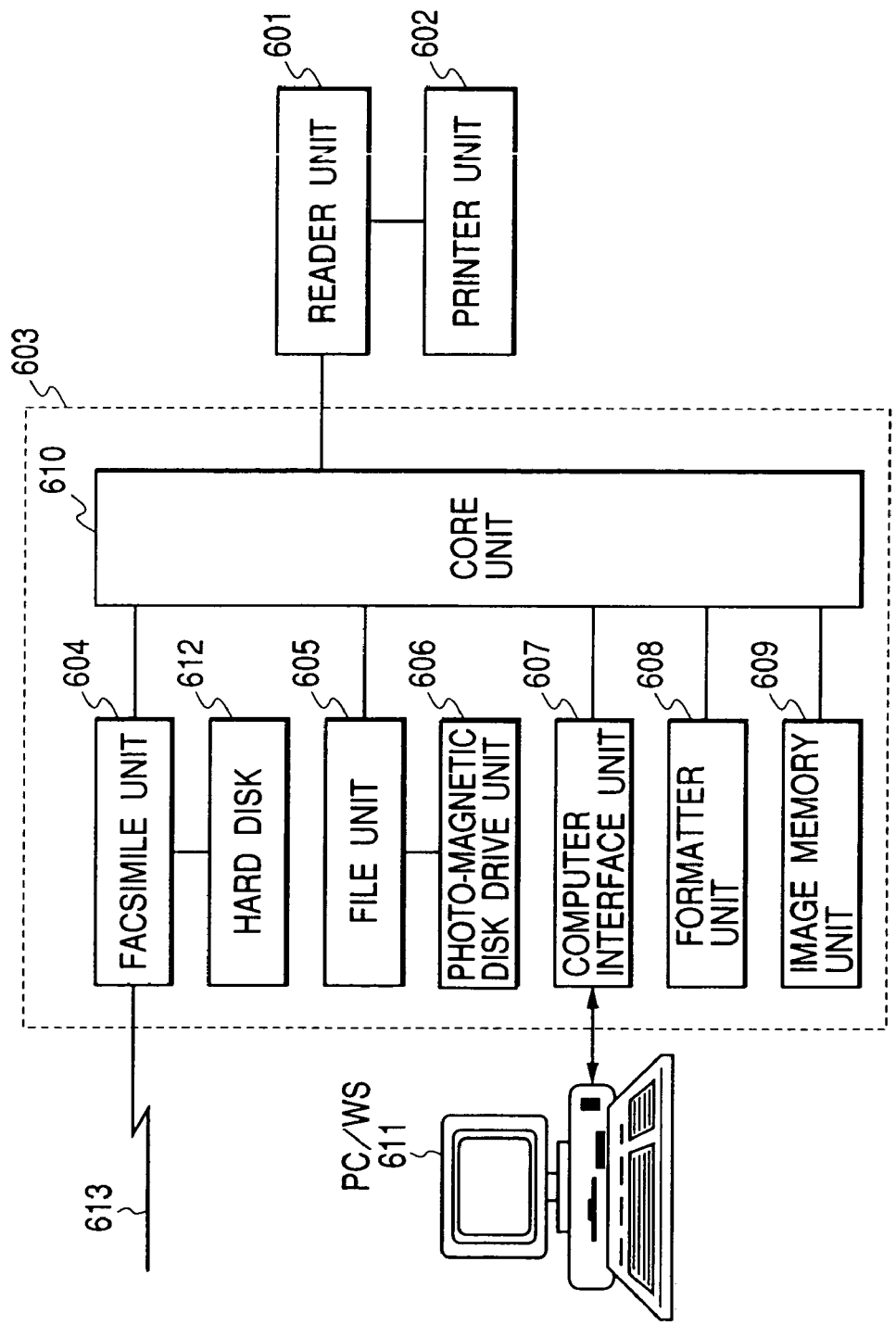
FIG. 13 is a block diagram showing an image pickup system according to the sixth embodiment.
Figure 14:
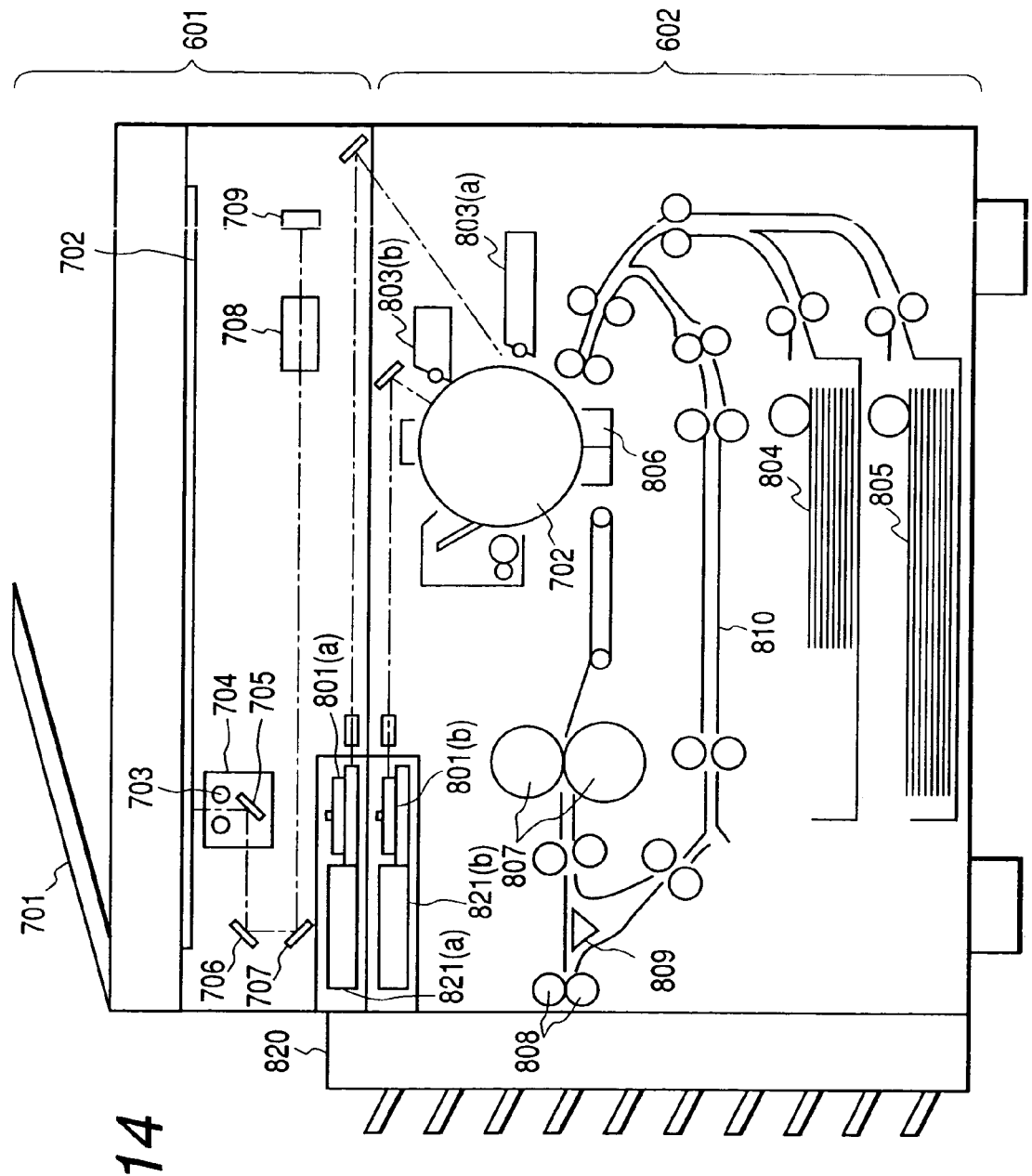
FIG. 14 is a sectional view showing the image pickup system according to the sixth embodiment.

FIGS. 13 and 14 are views showing an application of the solid-state image pickup apparatus described in the first or second embodiment to an original image read apparatus serving as an image pickup system having a communication function and the like.

FIG. 13 is a block diagram showing the arrangement of the image processing unit of the image read apparatus. In FIG. 13, a reader unit 601 reads an original image (not shown), and outputs image data corresponding to the original image to a printer unit 602 and image I/O control unit 603. The printer unit 602 records an image corresponding to image data from the reader unit 601 and image I/O control unit 603 on a recording sheet.

The image I/O control unit 603 is connected to the reader unit 601, and comprised of a facsimile unit 604, file unit 605, computer interface unit 607, formatter unit 608, image memory unit 609, and core unit 610. The facsimile unit 604 transfers to the core unit 610 image data obtained by decompressing compressed image data received via a telephone line 613, and transmits via the telephone line 613 compressed image data obtained by compressing image data transferred from the core unit 610. The facsimile unit 604 is connected to a hard disk 612 to allow temporarily storing the received compressed image data.

The file unit 605 is connected to the photo-magnetic disk drive unit 606. The file unit 605 compresses image data transferred from the core unit 610, and stores the image data together with a keyword for retrieving it in a photo-magnetic disk arranged in the photo-magnetic disk drive unit 606. The file unit 605 retrieves the compressed image data stored in the photo-magnetic disk based on a keyword transferred via the core unit 610. The file unit 605 reads and decompresses the retrieved compressed image data, and transfers the decompressed image data to the core unit 610.

The computer interface unit 607 is an interface between a personal computer or work station (PC/WS) 611 and the core unit 610.

The formatter unit 608 develops code data representing an image transferred from the PC/WS 611 into image data recordable by the printer unit 602. The image memory unit 609 temporarily stores data transferred from the PC/WS 611.

The core unit 610 controls the data flow between the reader unit 601, facsimile unit 604, file unit 605, computer interface unit 607, formatter unit 608, and image memory unit 609.

FIG. 14 is a sectional view showing the structures of the reader unit 601 and printer unit 602 in FIG. 13.

In FIG. 14, an original feeding device 701 of the reader unit 601 feeds the pages of an original (not shown) one by one from the last page to a platen glass 702, and discharges the original to the platen glass 702 after original read operation. When the original is fed to the platen glass 702, a lamp 703 is turned on, and a scanner unit 704 starts moving, thereby exposing and scanning the original.

Light reflected by the exposed/scanned original is guided to a solid-state image pickup apparatus 100 in the first or second embodiment by mirrors 705, 706, and 707 and lens 708. The scanned original image is read by the solid-state image pickup apparatus 100. Image data output from the solid-state image pickup apparatus 100 is subjected to processing such as shading correction, and transferred to the printer unit 602 or core unit 610.

Laser drivers 821 of the printer unit 602 drive corresponding laser beam-emitting units 801 to cause the laser beam-emitting units 801 to emit laser beams corresponding to the image data output from the reader unit 601.

The laser beams irradiate different positions on a photosensitive drum 802 to form a latent image corresponding to these laser beams on the photosensitive drum 802.

A developing mix adheres to the latent image portion of the photosensitive drum 802 by a developing device 803.

At a timing synchronized with the start of laser beam irradiation, a recording sheet is fed from either of cassettes 804 and 805 and conveyed to a transfer unit 806, and the developing mix adhered to the photosensitive drum 802 is transferred onto the recording sheet. The recording sheet to which the developing mix was transferred is conveyed to a fixing unit 807, and the developing mix is fixed to the recording sheet by the heat and pressure of the fixing unit 807.

The recording sheet having passed through the fixing unit 807 is discharged by discharge rollers 808. A sorter 820 sorts discharged recording sheets in corresponding bins to sort them. When the sorter 820 is not set, the rotational direction of the discharge rollers 808 is reversed after a recording sheet is conveyed to the discharge rollers 808, and the recording sheet is guided to a refeeding path 810 by a flapper 809.

When multiple recording is not set, a recording sheet is guided to the refeeding path 810 by the flapper 809 so as not to convey the recording sheet to the discharge rollers 808. The recording sheet guided to the refeeding path 810 is fed to the transfer unit 806 at the above-described timing.

The seventh embodiment of the present invention will be described below.

FIG. 15 is a block diagram showing a camera control system serving as an image pickup system having, e.g., the video camera in the third embodiment using the solid-state image pickup apparatus in the first or second embodiment.

The seventh embodiment is not limited to the video camera in the third embodiment, and may be applied to the still camera in the fourth embodiment.

FIG. 15 is a block diagram showing the schematic arrangement of the camera control system.

A network 910 transmits digital video data and digital camera control information (including status information), and is connected to n video transmission terminals 912 (912-1 to 912-n).

Each video transmission terminal 912 (912-1 to 912-n) is connected to a camera 916 (916-1 to 916-n) via a camera control device 914 (914-1 to 914-n). The camera control device 914 (914-1 to 914-n) controls the pan, tilt, zoom, focus, and iris of the connected video camera 916 (916-1 to 916-n) in accordance with control signals from the video transmission terminal 912 and video camera 916 (916-1 to 916-n).

The video camera 916 (916-1 to 916-n) receives power from the camera control device 914 (914-1 to 914-n), and the camera control device 914 (914-1 to 914-n) controls the power-on/off operation of the video camera 916 (916-1 to 916-n) in accordance with an external control signal.

The network 910 is connected to video reception terminals 918 (918-1 to 918-m) for receiving and displaying video information transmitted from the video transmission terminals 912 (912-1 to 912-n) to the network 910. Each video reception terminal 918 (918-1 to 918-m) is connected to a monitor 920 (920-1 to 920-m) formed with a bitmap display or CRT.

This network 910 need not be a wire network, and may be a radio network using a radio LAN or the like. In this case, the video reception terminal 918 can be integrated with the monitor 920 to constitute a portable video reception terminal device.

The video transmission terminal 912 (912-1 to 912-n) compresses an output video signal from the connected camera 916 (916-1 to 916-n) by a predetermined compression scheme such as H.261, and transmits the compressed data to a requesting video reception terminal 918 or all the video reception terminals 918 via the network 910.

The video reception terminal 918 can control power-on/off operation with various parameters (photographing azimuth, photographing magnification, focus, and iris) of an arbitrary camera 916 via the network 910, video transmission terminal 912, and camera control device 914.

The video transmission terminal 912 can serve as a video reception terminal by connecting a monitor and arranging a video decompression device for decompressing compressed video data. The video reception terminal 918 can serve as a video transmission terminal by connecting the camera control device 914 and video camera 916 and arranging a video compression device. These terminals comprise ROMs for storing software necessary for video transmission or video reception.

With the above arrangement, the video transmission terminal 912 transmits a video signal to the video reception terminal 918 at a remote place via the network 910, and receives a camera control signal transmitted from the video reception terminal 918 to control the pan and tilt of the camera 916.

The video reception terminal 918 transmits a camera control signal to the video transmission terminal 912. The video transmission terminal 912 having received the camera control signal controls the camera 916 in accordance with the contents of the camera control signal, and sends back the current state of the camera 916.

The video reception terminal 918 receives video data transmitted from the video transmission terminal 912, performs predetermined processing, and displays in real time the photographed image on the display screen of the monitor 920.

As has been described above, according to the first to seventh embodiments, a high-quality image can be obtained regardless of the conditions of an object to be picked up.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising:

a plurality of pixels each including a photoelectric conversion portion which converts an optical signal from an object into an electrical signal and a read portion which reads out the signal from said photoelectric conversion portion to an output line;

a drive control portion which controls a first mode for reading out from said read portion a pixel noise signal which is obtained by resetting an input portion of said read portion, and a second mode for reading out from said read portion an image signal which includes a signal generated by said photoelectric conversion portion;

a correction portion which subjects the image signal read out from said read portion, to correction processing which uses the pixel noise signal;

a detection portion which detects an object condition; and a switching portion which switches over the correction processing of said correction portion in accordance with an output of said detection portion;

wherein said detection portion detects that a signal level of the pixel noise signal is higher than a predetermined value.

* * * * *